United States Patent
Huang et al.

(10) Patent No.: US 8,963,881 B2
(45) Date of Patent: Feb. 24, 2015

(54) LOW POWER SWITCHING MODE DRIVING AND SENSING METHOD FOR CAPACITIVE MULTI-TOUCH SYSTEM

(71) Applicant: Orise Technology Co., Ltd., Hsinchu (TW)

(72) Inventors: Hsin-Mao Huang, Hsinchu (TW); Chih-Hung Kung, Miaoli County (TW); Yen-Lin Huang, Taipei (TW); Ying-Che Hsu, Tainan (TW)

(73) Assignee: Orise Technology Co., Ltd., Hsinchu Science Park (TW)

( * ) Notice: Subject to any disclaimer, the term of this patent is extended or adjusted under 35 U.S.C. 154(b) by 194 days.

(21) Appl. No.: 13/778,304

(22) Filed: Feb. 27, 2013

(65) Prior Publication Data

US 2013/0229382 A1    Sep. 5, 2013

(30) Foreign Application Priority Data

Mar. 3, 2012 (TW) .............................. 101107194 A

(51) Int. Cl.
*G06F 3/044* (2006.01)
*G06F 1/32* (2006.01)
*G06F 3/041* (2006.01)

(52) U.S. Cl.
CPC .............. *G06F 3/044* (2013.01); *G06F 1/3262* (2013.01); *G06F 3/0416* (2013.01)
USPC ........................................................ 345/174

(58) Field of Classification Search
USPC ................ 345/173, 174, 211, 214; 178/18.06
See application file for complete search history.

(56) References Cited

U.S. PATENT DOCUMENTS

| | | | |
|---|---|---|---|
| 2008/0162996 A1* | 7/2008 | Krah et al. ........................ | 714/27 |
| 2009/0244031 A1* | 10/2009 | Westerman et al. ........... | 345/174 |
| 2012/0050206 A1* | 3/2012 | Welland ......................... | 345/174 |
| 2012/0054379 A1* | 3/2012 | Leung et al. .................... | 710/23 |
| 2012/0068964 A1* | 3/2012 | Wright et al. .................. | 345/174 |
| 2013/0154982 A1* | 6/2013 | Hotelling et al. .............. | 345/173 |
| 2013/0234985 A1* | 9/2013 | Huang .......................... | 345/174 |
| 2013/0265276 A1* | 10/2013 | Obeidat et al. ................ | 345/174 |

* cited by examiner

*Primary Examiner* — Joe H Cheng
(74) *Attorney, Agent, or Firm* — Bacon & Thomas, PLLC

(57) ABSTRACT

A low power switching mode driving and sensing method for capacitive multi-touch systems is used in a capacitive multi-touch system with a capacitive touch panel. When the capacitive touch system operates in an idle mode, the method uses a self-capacitance driving and sensing technology to detect touch points. When the touch points are detected on the capacitive touch panel, the capacitive touch system is switched to an active mode and uses a mutual-capacitance driving and sensing technology to detect touch points for accurately acquiring the positions related to the touch points detected. During a predetermined time interval in which there is no touch point detected, the method automatically performs a calibration to update a mutual-capacitance base image raw data and a self-capacitance base image raw data, so as to overcome the drifting of sensors of the capacitive touch system.

10 Claims, 8 Drawing Sheets

LOW POWER SWITCHING MODE DRIVING AND SENSING METHOD FOR CAPACITIVE MULTI-TOUCH SYSTEM

CROSS REFERENCE TO RELATED APPLICATION

This application claims the benefits of the Taiwan Patent Application Serial Number 101107194, filed on Mar. 3, 2012, the subject matter of which is incorporated herein by reference.

BACKGROUND OF THE INVENTION

1. Field of the Invention

The present invention relates to the technical field of touch panels and, more particularly, to a low power switching mode driving and sensing method for capacitive multi-touch system.

2. Description of Related Art

The principle of touch panels are based on different sensing manners to detect a voltage, current, acoustic wave, or infrared to thereby detect the coordinate of a touch point on a screen as touched by a finger or other medium. For example, a resistive touch panel uses a potential difference between the upper and lower electrodes to compute the position of a pressed point for detecting the location of the touch point, and a capacitive touch panel uses a capacitance change generated in an electrostatic combination of the arranged transparent electrodes with the touching part of a human body to generate a current or voltage for detecting the coordinate of the touching part.

Upon the principle, the capacitive touch technologies can be divided into a surface capacitive and a projected capacitive sensing. The surface capacitive sensing has a simple configuration, so that the multi-touch implementation is not easy, and the problems of electromagnetic disturbance (EMI) and noises are difficult to be overcome. Therefore, the popular trend of capacitive touch development is toward the projected capacitive sensing.

The projected capacitive sensing can be divided into a self capacitance and a mutual capacitance sensing. The self capacitance sensing indicates that a capacitance coupling is generated between a touch object and a conductor line, and a touch occurrence is decided by measuring a capacitance change of the conductor line. The mutual capacitance sensing indicates that a capacitance coupling is generated between two adjacent conductor lines when a touch occurs.

A typical self capacitance sensing senses the grounded capacitance on every conductor line. Thus, a change of the grounded capacitance is used to determine whether an object is toward the capacitive touch panel. The self capacitance or the grounded capacitance is not a physical capacitor, but parasitic and stray capacitance on every conductor line. FIG. 1 is a schematic view of a typical self capacitance sensing. As shown in FIG. 1, at the first time interval, the driving and sensing devices 110 in a first direction drive the conductor lines in the first direction in order to further charge the self capacitance of the conductor lines in the first direction. At the second period, the driving and sensing devices 110 sense the voltages on the conductor lines in the first direction. At the third period, the driving and sensing devices 120 in a second direction drive the conductor lines in the second direction in order to further charge the self capacitance of the conductor lines in the second direction. At the fourth period, the driving and sensing devices 120 sense the voltages on the conductor lines in the second direction.

The typical self capacitance sensing of FIG. 1 connects both a driver circuit and a sensor circuit on a same conductor line in order to drive the conductor line and sense a signal change on the same conductor line to thereby decide a magnitude of the self capacitance. In this case, the advantages include:

(1) a reduced amount of data since the typical touch panel has m+n data in a single image only, so as to save the hardware cost;

(2) a reduced time required for sensing a touch point since an image raw data can be quickly fetched due to only two sensing operations, i.e., concurrently (or one-by-one) sensing all the conductor lines in the first direction first and then in the second direction, for completing a frame, as well as a relatively reduced time required for converting a sensed signal from analog into digital; and (3) a lower power consumption due to the reduced amount of data to be processed.

However, such a self capacitance sensing also has the disadvantages as follows:

(1) When there is a floating conductor, such as a water drop, an oil stain, and the like, on the touch panel, it causes an error decision on a touch point.

(2) When there are multiple touch points concurrently on the touch panel, it causes a ghost point effect, so that such a self capacitance sensing cannot be used in multi-touch applications.

Another way of driving the typical capacitive touch panel is to sense a magnitude change of mutual capacitance Cm to thereby determine whether an object is toward the touch panel. Likewise, the mutual capacitance Cm is not a physical capacitor but a mutual capacitance between the conductor lines in the first direction and in the second direction. FIG. 2 is a schematic diagram of a typical mutual capacitance sensing. As shown in FIG. 2, the drivers 210 are located on the first direction (Y), and the sensors 220 are located on the second direction (X). At the upper half of the first time interval T1, the drivers 210 drive the conductor lines 230 in the first direction and use the voltage Vy_1 to charge the mutual capacitance (Cm) 250, and at the lower half, all sensors 220 sense voltages (Vo_1, Vo_2, . . . , Vo_n) on the conductor lines 240 in the second direction to thereby obtain n data. Accordingly, the m×n data can be obtained after m driving periods.

Such a mutual capacitance sensing has the advantages as follows:

(1) It is easily determined whether a touch is generated from a human body since a signal generated from a floating conductor is in a different direction than a grounded conductor.

(2) Every touch point is indicated by a real coordinate, and the real position of each point can be found when multiple points are concurrently touched, so that such a mutual capacitance sensing can easily support the multi-touch applications.

Also, there are some disadvantages as follows:

(1) A single image raw data has an amount of n×m, which is relatively higher than the amount under the self capacitance sensing.

(2) A one-by-one scanning is operated in a selected direction. For example, when there are 20 conductor lines in the first direction (Y), the sensing operation is performed 20 times for obtaining a complete image raw data. Also, due to the large amount of data, the time required for converting a sensed signal from analog into digit is relatively increased.

(3) Due to the large amount of data, the power consumption is thus increased on data processing.

When a touch system is used in a portable device, the optimal use efficiency and allocation is required for the power consumption so as to avoid any waste. The touch system typically has the modes as follows, in order to provide a switch for enhancing the performance to thereby reduce the waste or increasing the use life.

(1) A sleep mode indicates that the touch system enters a state of low power consumption and reduced system resource occupancy when it is inactive or unused for a predetermined long time interval and only the required system wakeup mechanism is remained for the portable device. When the touch system enters in the sleep mode, a specific procedure is required for waking up the touch system to enter in an active/normal mode or idle/inactive mode. In addition, the amount of power consumption in the sleep mode is the lowest among all the modes.

(2) The idle/inactive mode indicates that the touch system enters a state of low power consumption and reduced system resource occupancy when it is inactive or unused for a predetermined short time interval and only the required basic units, which occupy fewer resources and consume less power, are remained in operation, as well as the internal units of the touch system that highly occupy the resources and heavily consume the power are closed. When the touch system enters in the idle/inactive mode, a user can touch the touch system again, so as to allow the touch system to quickly enter in the active/normal mode. Thus, the purpose of saving the unnecessary power consumption is achieved. The amount of power consumption in the idle/inactive mode is lower than that in the active/normal mode.

(3) The active/normal mode indicates that the user can completely use the functions of the touch system so as to quickly response to the use situations of the user. The optimal performance is obtained in the active/normal mode, and the heavy power consumption and the higher system resource occupancy are present. In this case, the amount of power consumption of the touch system in the active/normal mode is the heaviest among all the modes.

Furthermore, whether the self or the mutual capacitance operation is used, a comparison of currently obtained image raw data and base image raw data is required for knowing when a user touches on the touch system. However, the prior art uses a fixed base image raw data to compare with a currently new image raw data, and the fixed base image raw data may loss the accuracy due to the user at different environment conditions or time intervals, so as to lead the touch system to a failure.

Therefore, it is desirable to provide an improved low power switching mode driving and sensing method for capacitive multi-touch system to mitigate and/or obviate the aforementioned problems.

SUMMARY OF THE INVENTION

The object of the present invention is to provide a low power switching mode driving and sensing method for capacitive multi-touch system, which can reduce the power consumption used in a portable device to thereby prolong the use life and overcome the instability caused by the drifting of the self and the mutual capacitance driving and sensing.

To achieve the object, there is provided a low power switching mode driving and sensing method for capacitive multi-touch system, which is used in a capacitive multi-touch system with a capacitive touch panel. The capacitive multi-touch system includes a capacitive touch panel, a first driving and sensing device, a second driving and sensing device, and a controller. The first driving and sensing device and the second driving and sensing device respectively have an idle mode and an active mode. When the first and the second driving and sensing devices are in the idle mode, a self capacitance driving and sensing is performed. When the first and the second driving and sensing devices are in the active mode, a mutual capacitance driving and sensing is performed. The controller has a storage unit, a self capacitance counter, and a mutual capacitance counter. The method includes: (A) using the controller to initialize the first and the second driving and sensing devices; (B) using the controller to configure the first and the second driving and sensing devices into the active mode for sensing the capacitive touch panel to thereby produce a mutual capacitance base image raw data and store the mutual capacitance base image raw data in the storage unit; (C) using the controller to configure the first and the second driving and sensing devices into the idle mode for sensing the capacitive touch panel to produce a self capacitance base image raw data and store the self capacitance base image raw data in the storage unit; (D) sensing the capacitive touch panel to produce a self capacitance image raw data and store the self capacitance image raw data in the storage unit; (E) using the controller to detect touch points according to the self capacitance image raw data and the self capacitance base image raw data, and executing step (F) when the touch points are detected on the capacitive touch panel; (F) using the controller to reset the self capacitance counter and configure the first and the second driving and sensing devices into the active mode; (G) using the controller to reset the mutual capacitance counter; (H) using the first and the second driving and sensing devices to sense the capacitive touch panel to produce a mutual capacitance image raw data and store the mutual capacitance image raw data in the storage unit; (I) using the controller to detect touch points according to the mutual capacitance image raw data and the mutual capacitance base image raw data, and executing step (J) when the touch points are detected on the capacitive touch panel; and (J) using the controller to calculate coordinates of the touch points on the capacitive touch panel according to the mutual capacitance image raw data and the mutual capacitance base image raw data, wherein the first and the second driving and sensing devices in steps (D) and (E) are in the idle mode, and the first and the second driving and sensing devices in steps (F)-(J) are in the active mode.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
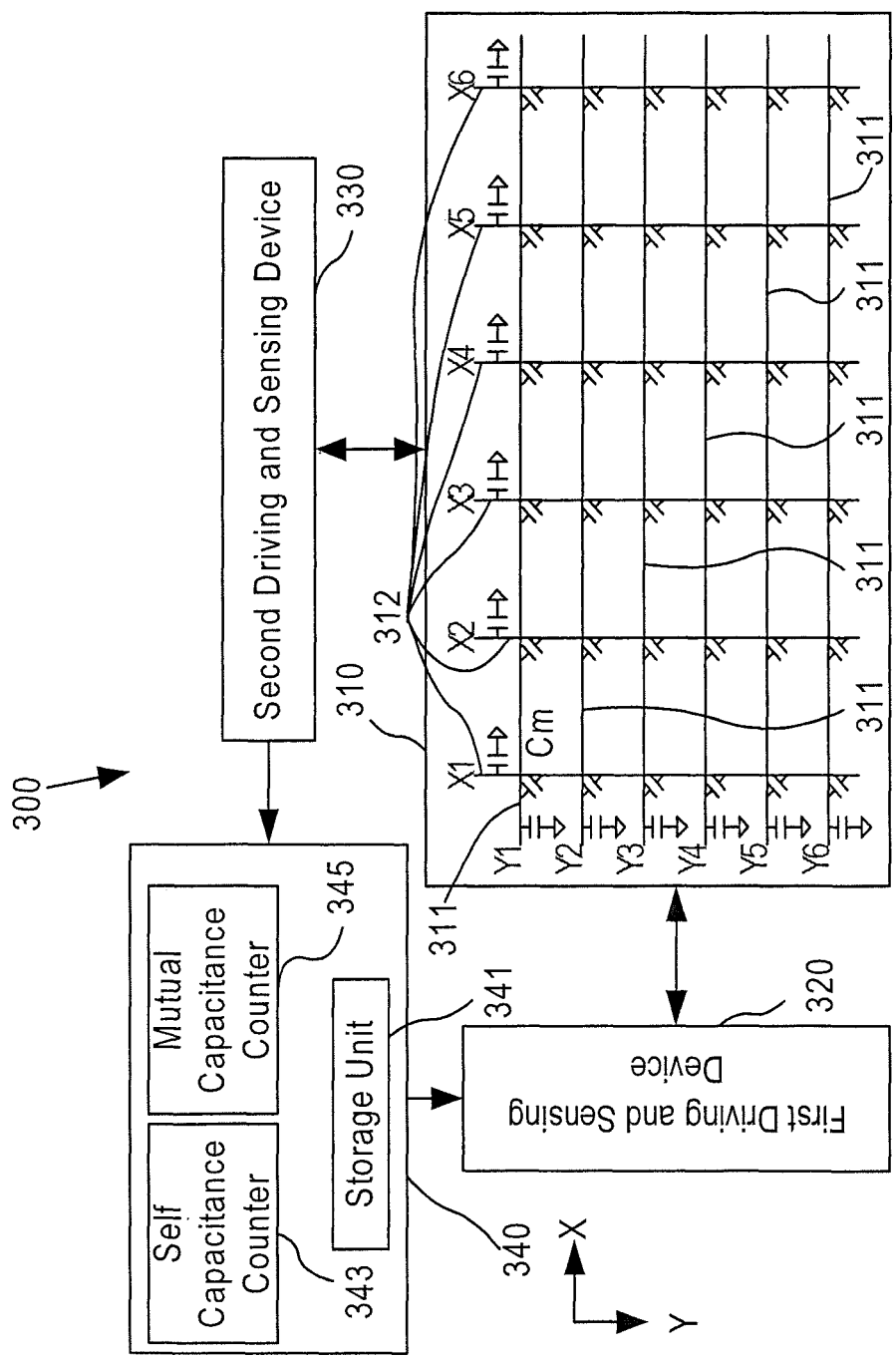
FIG. 3 is a block diagram of a capacitive multi-touch system with a capacitive touch panel that applies a low power switching mode driving and sensing method according to the invention.

The invention provides a low power switching mode driving and sensing method for capacitive multi-touch systems, which is used in a capacitive multi-touch system 300. FIG. 3 is a block diagram of the capacitive multi-touch system 300. The system 300 includes a capacitive touch panel 310, a first driving and sensing device 320, a second driving and sensing device 330, and a controller 340. The first driving and sensing device 320 and the second driving and sensing device 330 respectively have an idle mode and an active mode. A self capacitance driving and sensing is performed in the idle mode, and a mutual capacitance driving and sensing is performed in the active mode. The controller 340 has a storage unit 341, a self capacitance counter 343, and a mutual capacitance counter 345.

The capacitive touch panel 310 has a plurality of first conductor lines 311 (Y1-Y6) in a first direction (Y) and a plurality of second conductor lines 312 (X1-X6) in a second direction (X).

Figure 4:
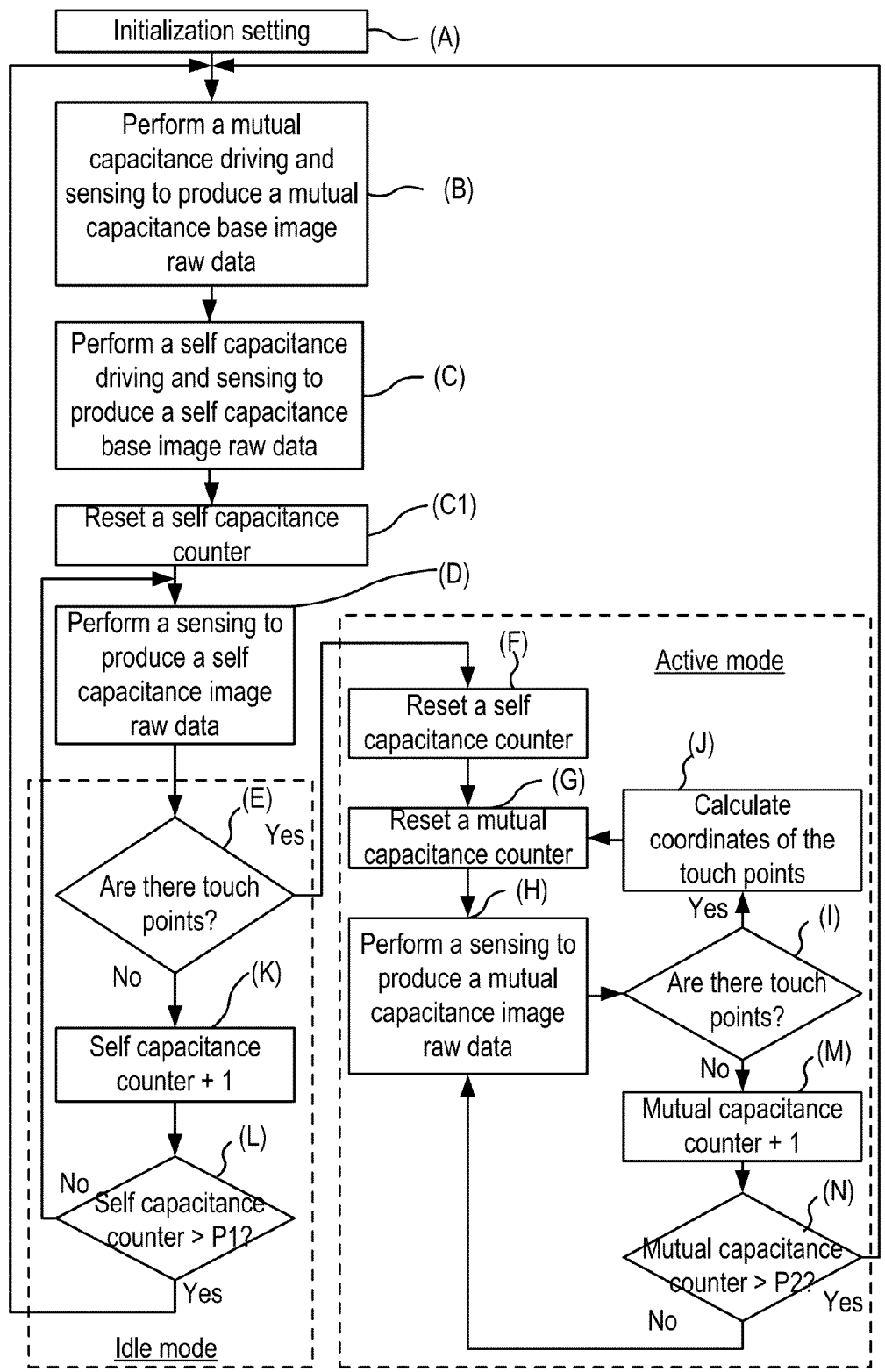
FIG. 4 is a flowchart of a low power switching mode driving and sensing method for capacitive multi-touch systems according to the invention.

FIG. 4 is a flowchart of a low power switching mode driving and sensing method for capacitive multi-touch systems according to the invention. First, in step (A), the controller 340 initializes the first and the second driving and sensing devices 320 and 330, the storage unit 341, the self capacitance counter 343, and the mutual capacitance counter 345. The first and the second driving and sensing devices 320 and 330 are initialized to configure the parameter settings of a driving wave including its number, frequency, pattern, and the like. Also, the storage unit 341, the self capacitance counter 343, and the mutual capacitance counter 345 are initialized to set their initial values for avoiding the poor influence on the system, which is caused by the random number initialization values generated from no initialization.

In step (B), the controller 340 configures the first and the second driving and sensing devices 320 and 330 into the active mode, and performs a mutual capacitance driving and sensing on the capacitive touch panel to thereby produce a mutual capacitance base image raw data (MCBIRD) and store the data in the storage unit 341.

In step (B), the controller 340 essentially performs a mutual capacitance driving and sensing during a short time interval in which the system initializes at early and a user does not touch the capacitive touch panel 310, so as to obtain the MCBIRD data and store the MCBIRD data in the storage unit 341 for a reference and comparison when the mutual capacitance driving and sensing is performed subsequently.

In step (C), the controller 340 configures the first and the second driving and sensing devices 320 and 330 into the idle mode, and performs a self capacitance driving and sensing on the capacitive touch panel to thereby produce a self capacitance base image raw data (SCBIRD) and store the data in the storage unit 341.

In step (C), the controller 340 essentially performs a self capacitance driving and sensing during a short time interval in which the system initializes at early and a user does not touch the capacitive touch panel 310, so as to obtain the SCBIRD data and store the SCBIRD data in the storage unit 341 for a reference and comparison when the mutual capacitance driving and sensing is performed subsequently.

In step (C1), the controller 340 resets the self capacitance counter 343. In other embodiments, the self capacitance counter 343 can be replaced by a timer.

In step (C1), the controller 340 removes a count in the self capacitance counter 343 that indicates how many times there are in step (C) to perform the self capacitance driving and sensing or a time interval that indicates how long the procedure is performed, which is done by resetting the self capacitance counter 343 or a timer, thereby obtaining the initialization.

In step (D), the capacitive touch panel 310 is sensed to thereby produce a self capacitance image raw data (SCIRD) and store the data in the storage unit 341.

The operation in step (D) is similar to step (C) in which the self capacitance driving and sensing is used to obtain a raw data of the capacitive touch panel 310, except that the SCIBD data obtained in step (D) is stored in a different space of the storage unit 341 than the SCBIRD data for a subsequent decision and use. In addition, after step (D) is completely performed, the first and the second driving and sensing devices 320 and 330 enter into the idle mode.

In step (E), the controller 340 is based on the SCIRD data and the SCBIRD data to determine whether there are touch points on the capacitive touch panel 310; if yes, it enters into the active mode, and step (F) is executed.

In step (E), the controller 340 compares the SCIRD data and the SCBIRD data to determine whether a self capacitance of the capacitive touch panel 310 is changed. Namely, it is determined whether the self capacitance of every first conductor line 311 (Y1-Y6) and the self capacitance of every second conductor line 312 (X1-X6) are changed on the capacitive touch panel 310.

In a further description, step (E) compares the SCIRD data obtained in step (D) and the SCBIRD data obtained in step (C) to thereby determine whether the difference is over a first threshold. The first threshold can be modified as required for the design of capacitive multi-touch system 300, and changed with a change of the SCBIRD data. Namely, when the SCIRD data obtained in step (D) and the SCBIRD data obtained in step (C) have a small difference over the first threshold, it is determined that the user touches the capacitive touch panel 310 in step (D), so the mutual capacitance driving and sensing is triggered in next step in order to perform a coordinate transform operation. When the difference is not over the first threshold, it is determined that the user does not touch the capacitive touch panel 310, so that the self capacitance driving and sensing is proceeded, and step (K) is executed.

Figure 5:
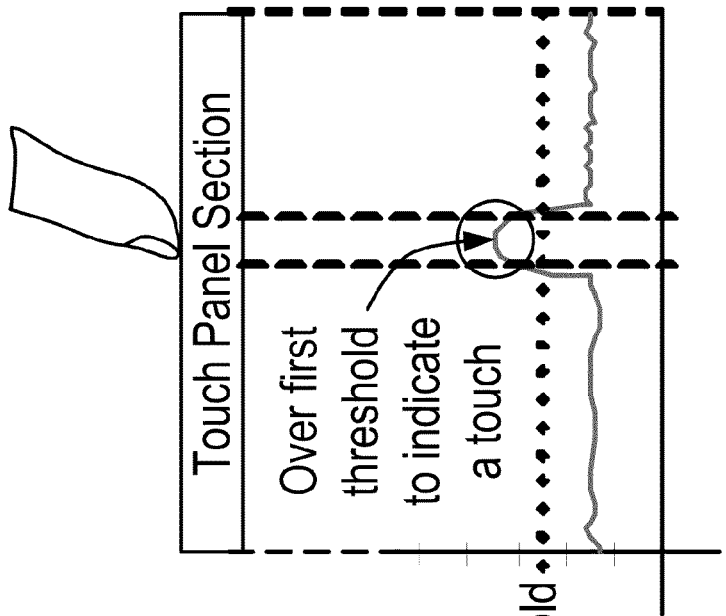
FIG. 5 is a schematic diagram of a threshold for determining whether a touch exists in a self capacitance driving and sensing according to the invention.
Figure 5:
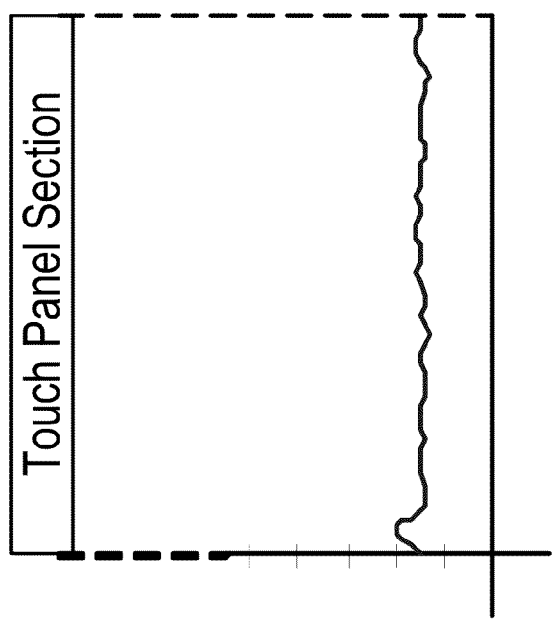

FIG. 5 is a schematic diagram of a threshold for determining whether a touch exists in a self capacitance driving and sensing according to the invention. As shown in FIG. 5, the circle indicates the SCIRD data and the SCBIRD data have a difference over the first threshold to thereby determine that the user touches the capacitive touch panel 310.

Figure 6:
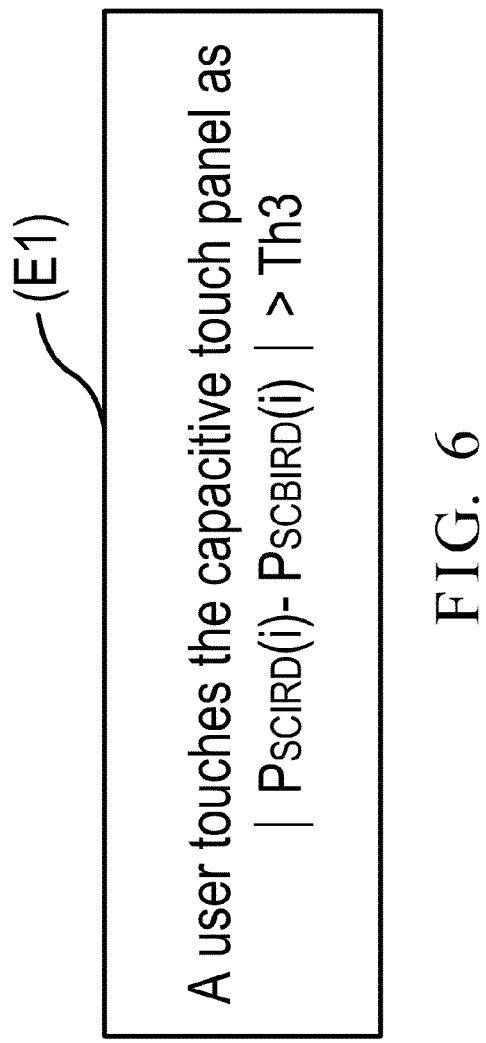
FIG. 6 is a flowchart of determining whether a touch point exists in a self capacitance driving and sensing according to the invention.

In other embodiments, step (E) can determine whether there are touch points as follows. FIG. 6 is a flowchart for determining whether a touch point exists in a self capacitance driving and sensing according to the invention.

In step (E1), when an absolute value of the difference of $P_{SCIRD}(i)$ and $P_{SCBIRD}(i)$ is greater than a third predetermined value Th3, a first trigger signal Trigger1 is produced, where i indicates a data range covered by the SCIRD data and the SCBIRD data, $P_{SCIRD}(i)$ indicates a value of the SCIRD data, and $P_{SCBIRD}(i)$ indicates a value of the SCBIRD data.

The capacitive touch panel 310 has m first conductor lines 311 (Y1-Y6) in the first direction (Y) and n second conductor lines 312 (X1-X6) in the second direction (X), so the SCIRD data and the SCBIRD data have an amount of m+n data, where i ranges from 0 to (m+n−1).

When the absolute value of the difference of $P_{SCIRD}(i)$ and $P_{SCBIRD}(i)$ is greater than the third predetermined value Th3, it indicates the self capacitance of corresponding conductor lines is changed; i.e., the user possibly touches the capacitive touch panel 310.

By only detecting whether the absolute value of the difference of $P_{SCIRD}(i)$ and $P_{SCBIRD}(i)$ is greater than the third predetermined value Th3 (or the first threshold in FIG. 5), step (E1) can determine that the system is possibly touched by the user, and in this case the process goes to step (F).

In step (F), the controller 340 resets the self capacitance counter 343. In step (G), the controller 340 resets the mutual capacitance counter 345. In other embodiments, the mutual capacitance counter 345 can be replaced with a timer. In addition, when the procedure enters into step (F), it indicates that the first and the second driving and sensing devices 320 and 330 enter into the active mode, such that the controller 340 configures the first and the second driving and sensing devices 320 and 330 into the active mode.

Step (G) removes a count in the mutual capacitance counter 345 that indicates how many times there are to perform the self capacitance driving and sensing or a time interval that indicates how long the procedure is performed, which is done by resetting the mutual capacitance counter 345 or the timer, thereby obtaining the initialization.

In step (H), the first and the second driving and sensing devices 320 and 330 performs a mutual capacitance driving and sensing on the capacitive touch panel 310 to thereby produce a mutual capacitance image raw data (MCIRD) and store the data in the storage unit 341.

The operation performed in step (H) is similar to step (B) in which the mutual capacitance driving and sensing is used to obtain a raw data of the capacitive touch panel 310, except that the MCIBD data obtained in step (H) is stored in a different space of the storage unit 341 than the MCBIRD data for a subsequent decision and use.

In step (I), the controller 340 is based on the MCIRD data and the MCBIRD data to determine whether there are touch points on the capacitive touch panel 310; if yes, step (J) is executed.

In step (I), the controller 340 compares the MCIRD data and the MCBIRD data to determine whether a self capacitance of the capacitive touch panel 310 is changed. Namely, it is determined whether the self capacitance at the intersection of every first conductor line 311 (Y1-Y6) and second conductor line 312 (X1-X6) on the capacitive touch panel 310 is changed.

Step (I) compares the MCIRD data obtained in step (H) and the MCBIRD data obtained in step (B) to thereby determine whether the difference is over a second threshold. The second threshold can be modified as required for the design of capacitive multi-touch system 300, and changed with a change of the MCBIRD data. Namely, when the MCIRD data obtained in step (H) and the MCBIRD data obtained in step (B) have a small difference over the second threshold, it is determined that the user touches the capacitive touch panel 310 in step (H), so that step (J) is subsequently executed in order to perform a coordinate transform operation. When the difference is not over the second threshold, it is determined that the user does not touch the capacitive touch panel, so that the mutual capacitance driving and sensing is performed, and step (M) is executed.

Figure 7:
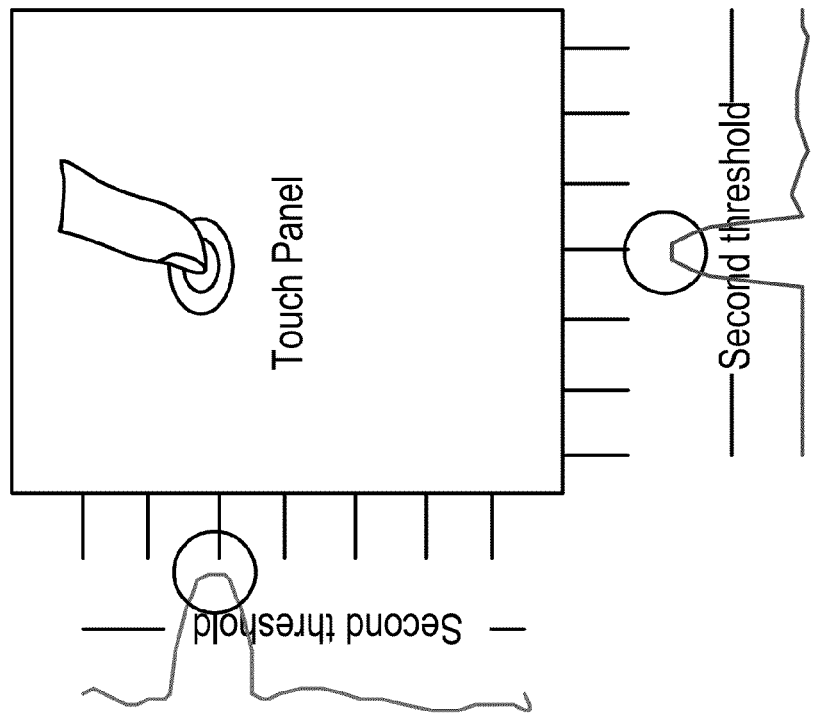
FIG. 7 is a schematic diagram of a threshold for determining whether a touch exists in a mutual capacitance driving and sensing according to the invention.
Figure 7:
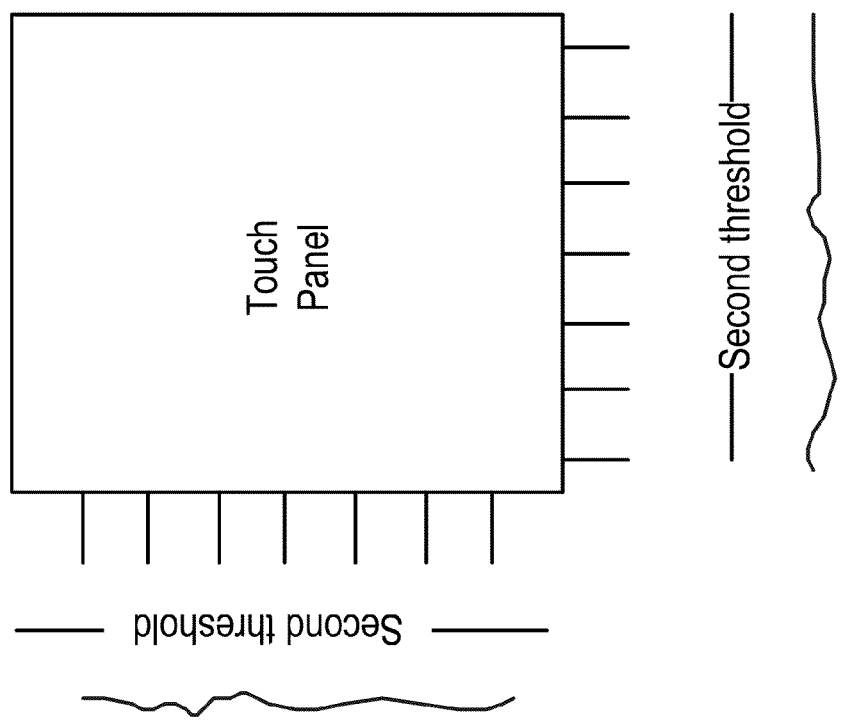

FIG. 7 is a schematic diagram of a threshold for determining whether a touch exists in a mutual capacitance driving and sensing according to the invention. As shown in FIG. 7, the circle indicates that the MCIRD data and the MCBIRD data have a difference over the second threshold to thereby determine that the user touches the capacitive touch panel 310.

Figure 8:
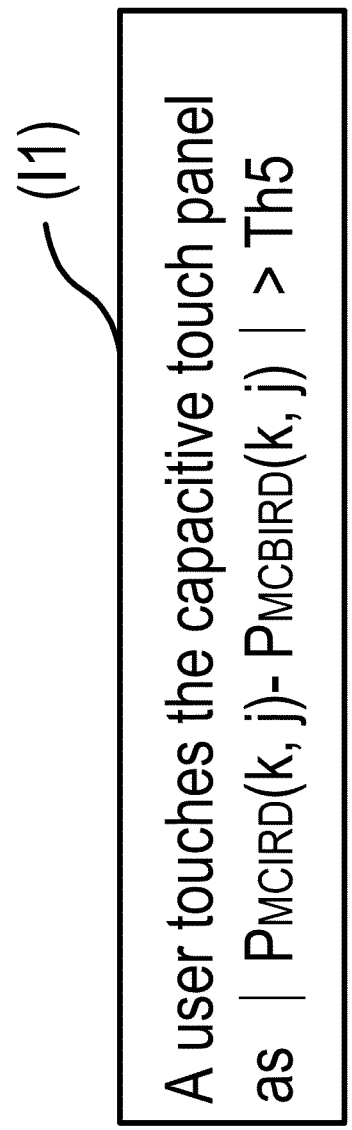
FIG. 8 is a flowchart of determining whether a touch point exists in a mutual capacitance driving and sensing according to the invention.

In other embodiments, step (I) can determine whether there are touch points as follows. FIG. 8 is a flowchart of determining whether a touch point exists in a mutual capacitance driving and sensing according to the invention.

In step (I1), when an absolute value of the difference of $P_{MCIRD}(k,j)$ and $P_{MCBIRD}(k,j)$ is greater than a fifth predetermined value Th5, a second trigger signal Trigger2 is produced, where k, j indicate an image range covered by the MCIRD data and the MCBIRD data, $P_{MCIRD}(k,j)$ indicates a value of the MCIRD data, and $P_{MCBIRD}(k,j)$ indicates a value of the MCBIRD data.

The capacitive touch panel 310 has m first conductor lines 311 (Y1-Y6) in the first direction (Y) and n second conductor lines 312 (X1-X6) in the second direction (X), so that the MCIRD data and the MCBIRD data have an amount of m+n data, where k ranges from 0 to (m−1) and j ranges from 0 to (n−1).

When the absolute value of the difference of $P_{MCIRD}(k,j)$ and $P_{MCBIRD}(k,j)$ is greater than the fifth predetermined value Th5, it indicates that the mutual capacitance at the intersection of corresponding conductor lines is changed; i.e., the user possibly touches the capacitive touch panel 310.

By only detecting whether the absolute value of the difference of $P_{MCIRD}(k,j)$ and $P_{MCBIRD}(k,j)$ is greater than the fifth predetermined value Th5 (or the second threshold in FIG. 7), step (I1) can determine that the system is possibly touched by the user, and in this case the procedure goes to step (J).

In step (J), the controller 340 is based on the difference of the MCIRD data and the MCBIRD data to calculate a position or coordinate of the touch point on the capacitive touch panel.

The controller 340 in step (E) determines that there is no touch point on the capacitive touch panel 310, so that step (K) is executed to add the self capacitance counter by one.

Further, in step (L), the controller 340 determines whether the self capacitance counter 343 is over a first predetermined value P1; if no, step (D) is executed, and if yes, step (B) is executed.

Step (L) determines whether the count of how many times there are to perform step (K) or a result of accumulated and stored operation time reaches to the first predetermined value P1. The first predetermined value P1 can be designed and set by the system designer. When step (L) determines that the count or the result is not over the first predetermined value P1, step (D) is executed again. When the count or the result is over the first predetermined value P1, it indicates that the time or number of performing the self capacitance driving and sensing reaches to a certain quantity, steps (B) and (C) are executed again to thereby update the MCBIRD data and the SCBIRD data.

In step (I), the controller 340 determines that there is no touch point on the capacitive touch panel 310, and step (M) is executed to add the mutual counter 345 by one.

In step (N), the controller 340 determines whether the mutual capacitance counter 345 is over a second predetermined value P2; if no, step (H) is executed, and otherwise step (B) is executed.

Step (N) is based on the count of how many times there are to perform step (M) or a result of accumulated and stored operation time to determine whether the mutual capacitance counter 345 reaches to the second predetermined value P2. The second predetermined value P2 can be modified and set as required for the system design. When step (N) determines that the count or the result is not over the second predetermined value P2, step (H) is executed again. When the count or the result is over the second predetermined value P2, it indicates that the time or number of performing the self capacitance driving and sensing reaches to a certain quantity, steps (B) and (C) are executed again to thereby update the MCBIRD data and the SCBIRD data.

In steps (F), (G), (H), (I), (J), (M), and (N), the first and the second driving and sensing devices 320 and 330 are in the active mode.

When the self capacitance counter 343 is over the first predetermined value P1 or the mutual capacitance counter 345 is over the second predetermined value P2, the procedure returns to step (B), and in steps (B) and (C), the MCBIRD data and the SCBIRD data are updated and fetched to thereby overcome the problem of losing the accuracy when the fixed base image raw data compares with the currently new image raw data in the prior art.

The prior art typically uses a single driving wave, a driving wave of reduced frequency, or a driving wave of reduced frequency and different numbers to detect whether a user touches the capacitive touch panel when the capacitive multi-touch system enters into the idle mode. On the other hand, the invention uses the self capacitance driving and sensing technology to determine whether there is a need of changing the idle mode into the active mode, which can reduce the design complexity of an analog-end circuit and its power consumption so as to achieve a better power saving.

In addition, the invention has an additional feature of automatically periodically or fixedly performing an adjustment on the MCBIRD data and the SCBIRD data. Namely, when no user touches the capacitive multi-touch system 300, the automatic calibration is performed with a fixed number of operation frequency or in periodic to thereby obtain the updated MCBIRD and SCBIRD data. Thus, the invention can overcome the instability caused by a shifting of the self capacitance and the mutual capacitance driving and sensing due to the environment, the time, or the like, as compared with the prior art that performs the calibration only at power-on or when the system is manufactured at the factory.

As cited, the invention is able to allow the capacitive multi-touch system 300 in the idle/inactive mode to use the self capacitance driving and sensing technology to detect a user's operation state in a manner of power saving and using fewer resources. As soon as a user touching the capacitive touch panel 310 is detected, the capacitive multi-touch system 300 changes into the active mode from the idle mode in order to accurately detect the positions of the touch points. In addition, the invention performs a calibration on the MCBIRD and SCBIRD data with a fixed number of operation frequency or in periodic, so as to effectively improve the shifting on the MCBIRD data and the SCBIRD data due to the factor of use time or environment change, or the like.

Although the present invention has been explained in relation to its preferred embodiment, it is to be understood that many other possible modifications and variations can be made without departing from the spirit and scope of the invention as hereinafter claimed. 圖式翻譯

Figure 1:
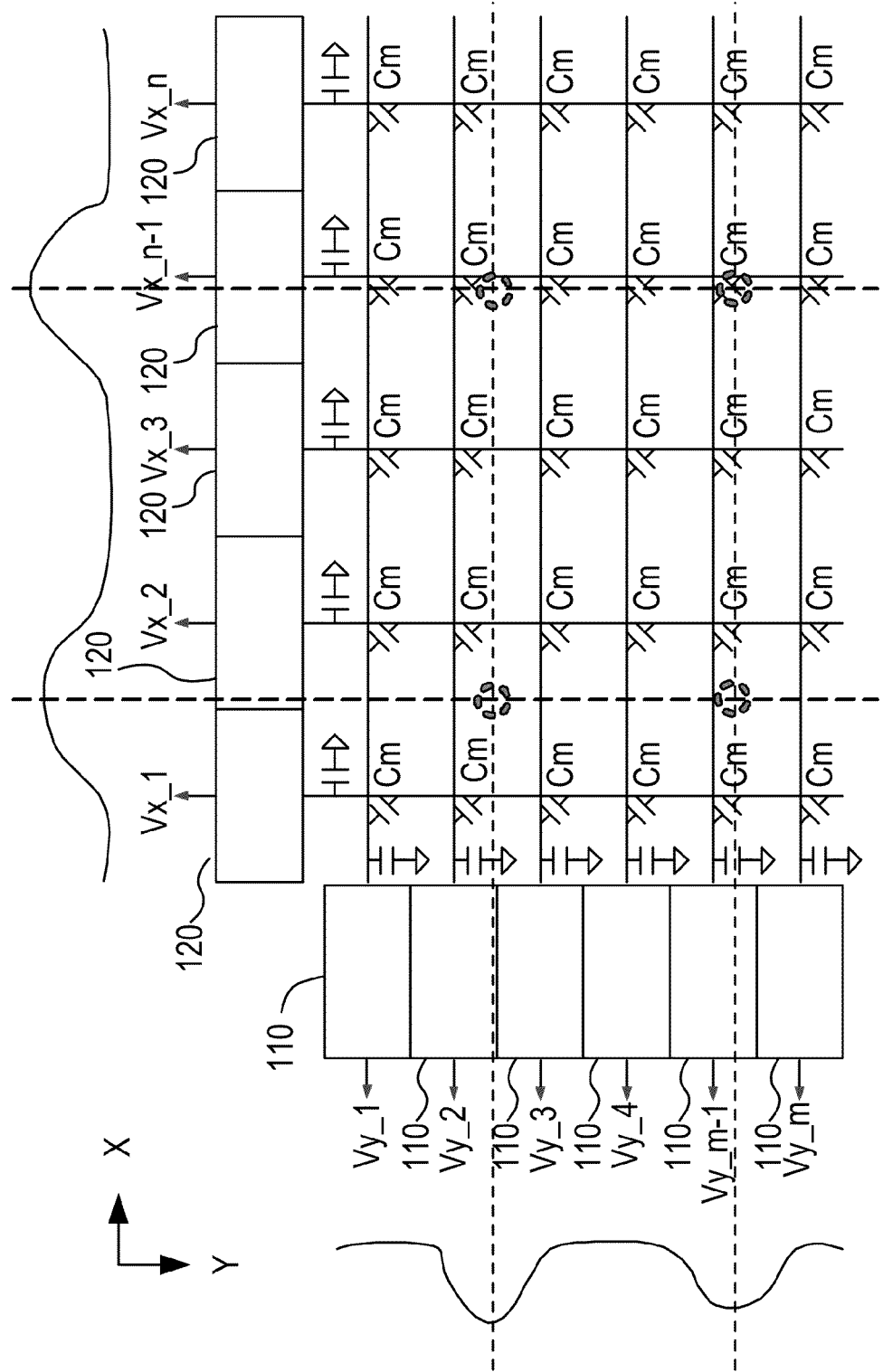
FIG. 1 is a schematic diagram of a typical self capacitance sensing.
Figure 2:
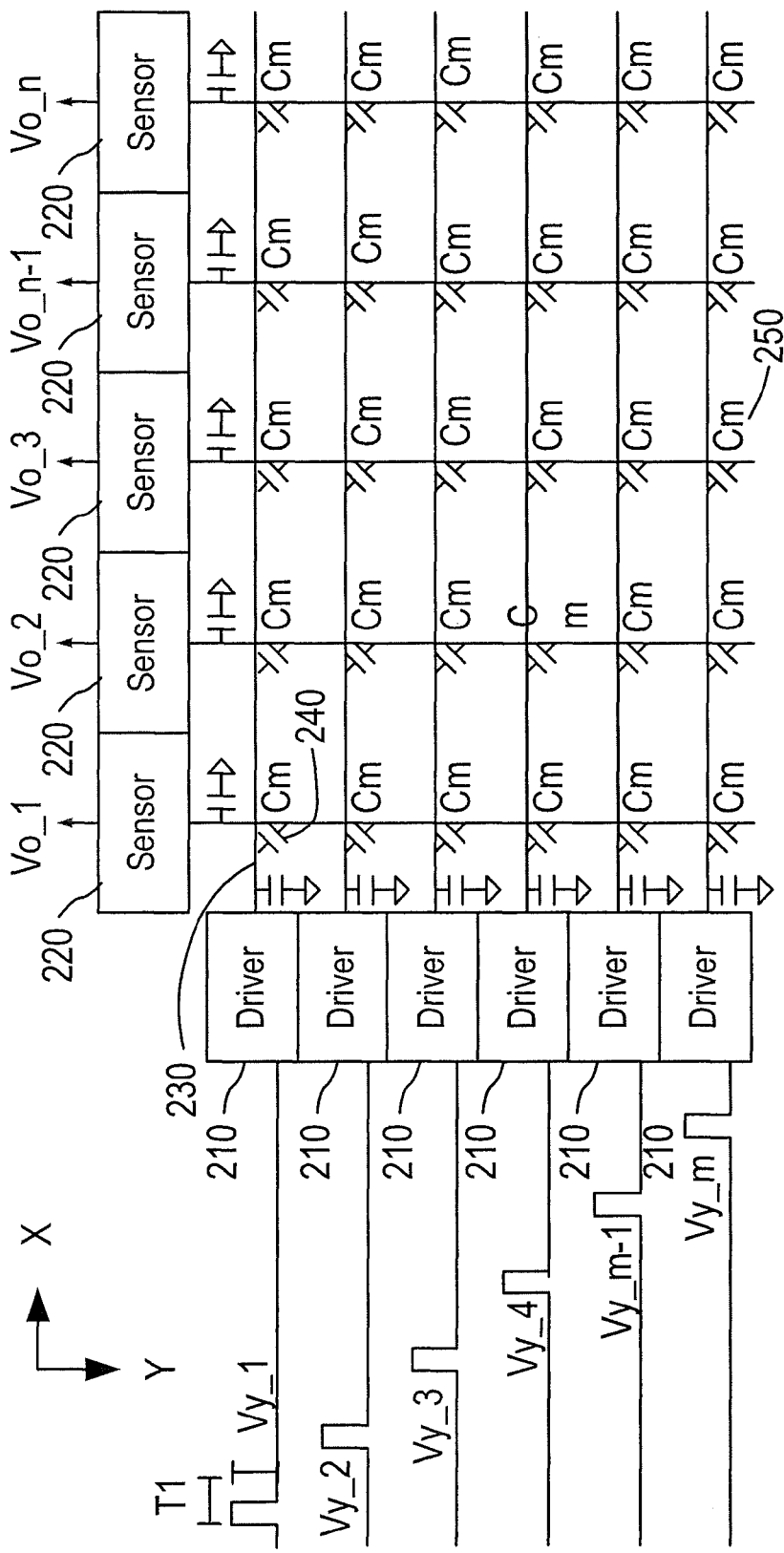
FIG. 2 is a schematic diagram of a typical mutual capacitance sensing.

FIG. 1 (Prior Art)
110~Driving and Sensing Device
120~Driving and Sensing Device
FIG. 2 (Prior Art)
210~Driver
220~Sensor
FIG. 3
320~First Driving and Sensing Device
330~Second Driving and Sensing Device
341~Storage Unit
343~Self Capacitance Counter
345~Mutual Capacitance Counter
FIG. 4
(A) Initialization setting
(B) Perform a mutual capacitance driving and sensing to produce a mutual capacitance base image raw data
(C) Perform a self capacitance driving and sensing to produce a self capacitance base image raw data
(C1) Reset a self capacitance counter
(D) Perform a sensing to produce a self capacitance image raw data
(E) Are there touch points?
(F) Reset a self capacitance counter
(G) Reset a mutual capacitance counter
(H) Perform a sensing to produce a mutual capacitance image raw data
(I) Are there touch points?
(J) Calculate coordinates of the touch points
(K) Self capacitance counter+1
(L) Self capacitance counter>P1?
(M) Mutual capacitance counter+1
(N) Mutual capacitance counter>P2?
是 ~Yes
否 ~No
閒置模式 ~Idle mode
工作模式 ~Active mode
FIG. 5
觸控面板 橫切面 ~Touch Panel Section
超過第一-臨界值, 有觸摸 ~Over first threshold to indicate a touch
第一臨界值 ~First threshold
FIG. 6
$|P_{SCIRD}(i)-P_{SCBIRD}(i)|>Th3$ 時, 使用者 . . . ~A user touches the capacitive touch panel as $|P_{SCIRD}(i)-P_{SCBIRD}(i)|>Th3$
FIG. 7
觸控面板 ~Touch Panel
第一臨界值 ~Second threshold
FIG. 8
$|P_{MCIRD}(k,j)-P_{MCBIRD}(k,j)|>Th5$, 使用者 . . . ~A user touches the capacitive touch panel as $|P_{MCIRD}(k,j)-P_{MCBIRD}(k,j)|>Th5$

What is claimed is:

1. A low power switching mode driving and sensing method for capacitive multi-touch systems, which is used in a capacitive multi-touch system including a capacitive touch panel, a first driving and sensing device, a second driving and sensing device, and a controller, the first driving and sensing device and the second driving and sensing device respectively having an idle mode and an active mode for performing a self capacitance driving and sensing when the first and second driving and sensing devices are in the idle mode and a mutual capacitance driving and sensing when the first and second driving and sensing devices are in the active mode, the controller having a storage unit, a self capacitance counter, and a mutual capacitance counter, the method comprising the steps of:

(A) using the controller to initialize the first and the second driving and sensing devices;

(B) using the controller to configure the first and the second driving and sensing devices into the active mode for sensing the capacitive touch panel to thereby produce a mutual capacitance base image raw data and store the mutual capacitance base image raw data in the storage unit;

(C) using the controller to configure the first and the second driving and sensing devices into the idle mode for sensing the capacitive touch panel to produce a self capacitance base image raw data and store the self capacitance base image raw data in the storage unit;

(D) sensing the capacitive touch panel to produce a self capacitance image raw data and store the self capacitance image raw data in the storage unit;

(E) using the controller to detect touch points according to the self capacitance image raw data and the self capacitance base image raw data, and executing step (F) when the touch points are detected on the capacitive touch panel;

(F) using the controller to reset the self capacitance counter and configure the first and the second driving and sensing devices into the active mode;

(G) using the controller to reset the mutual capacitance counter;

(H) using the first and the second driving and sensing devices to sense the capacitive touch panel to produce a mutual capacitance image raw data and store the mutual capacitance image raw data in the storage unit;

(I) using the controller to detect touch points according to the mutual capacitance image raw data and the mutual capacitance base image raw data, and executing step (J) when the touch points are detected on the capacitive touch panel; and (J) using the controller to calculate coordinates of the touch points on the capacitive touch panel according to the mutual capacitance image raw data and the mutual capacitance base image raw data, wherein the first and the second driving and sensing devices in steps (D) and (E) are in the idle mode, and the first and the second driving and sensing devices in steps (F)-(J) are in the active mode.

2. The method as claimed in claim 1, wherein step (C) comprises the step of:

(C1) using the controller to reset the self capacitance counter.

3. The method as claimed in claim 2, further comprising, when the controller in step (E) determines that there is no touch point on the capacitive touch panel, the steps of:

(K) adding the self capacitance counter by one; and (L) using the controller to determine whether the self capacitance counter is over a first predetermined value, and executing step (D) when the self capacitance counter is not over the first predetermined value, or executing step (B) when the self capacitance counter is over the first predetermined value.

4. The method as claimed in claim 3, further comprising, when the controller in step (I) determines that there is no touch point on the capacitive touch panel, the steps of:

(M) adding the mutual capacitance counter by one; and (N) using the controller to determine whether the mutual capacitance counter is over a second predetermined value, and executing step (H) when the mutual capacitance counter is not over the second predetermined value, or executing step (B) when the mutual capacitance counter is over the second predetermined value.

5. The method as claimed in claim 4, wherein the controller in step (I) compares the mutual capacitance image raw data and the mutual capacitance base image raw data to detect a change of mutual capacitance on the capacitive touch panel.

6. The method as claimed in claim 5, wherein step (I) comprises the step of:

(I1) determining that the capacitive touch panel is touched when an absolute value of a difference of data $P_{MCIRD}(k,j)$ and $P_{MCBIRD}(k,j)$ is greater than a fifth predetermined value, where k, j indicate an image range covered by the mutual capacitance image raw data and the mutual capacitance base image raw data, $P_{MCIRD}(k,j)$ indicates a value of the mutual capacitance image raw data, and $P_{MCBIRD}(k,j)$ indicates a value of the mutual capacitance base image raw data.

7. The method as claimed in claim 6, wherein the first and the second driving and sensing devices in steps (K) and (L) are in the idle mode.

8. The method as claimed in claim 7, wherein the first and the second driving and sensing devices in steps (M) and (N) are in the active mode.

9. The method as claimed in claim 3, wherein the controller in step (E) compares the self capacitance image raw data and the self capacitance base image raw data to detect a change of self capacitance on the capacitive touch panel.

10. The method as claimed in claim 9, wherein step (E) comprises the step of:

(E1) determining that the capacitive touch panel is touched when an absolute value of a difference of data $P_{SCIRD}(i)$ and $P_{SCBIRD}(i)$ is greater than a third predetermined value, where i indicates a data range covered by the self capacitance image raw data and the self capacitance base image raw data, $P_{SCIRD}(i)$ indicates a value of the self capacitance image raw data, and $P_{SCBIRD}(i)$ indicates a value of the self capacitance base image raw data.

* * * * *